United States Patent
Choi et al.

(10) Patent No.: US 10,191,329 B2
(45) Date of Patent: Jan. 29, 2019

(54) REFLECTIVE LIGHT CONTROL FILM AND DISPLAY DEVICE FOR A CAR COMPRISING THE SAME

(71) Applicant: DONGWOO FINE-CHEM CO., LTD., Jeollabuk-do (KR)

(72) Inventors: Bong Jin Choi, Gyeonggi-do (KR); Gi Hwan Ahn, Chungcheongnam-do (KR); Joong Han Kum, Chungcheongnam-do (KR); Jeung Hoon On, Gyeonggi-do (KR); Han Young Choi, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 15/636,828

(22) Filed: Jun. 29, 2017

(65) Prior Publication Data
US 2018/0004043 A1    Jan. 4, 2018

(30) Foreign Application Priority Data
Jul. 1, 2016  (KR) .......................... 10-2016-0083547

(51) Int. Cl.
*G02F 1/1335* (2006.01)
*G02F 1/1333* (2006.01)
(Continued)

(52) U.S. Cl.
CPC ........ *G02F 1/133606* (2013.01); *B60J 3/007* (2013.01); *G02B 5/09* (2013.01);
(Continued)

(58) Field of Classification Search
CPC ... G02F 1/133606; G02F 2001/133607; G02F 1/133512; G02F 1/133504;
(Continued)

(56) References Cited

U.S. PATENT DOCUMENTS

| 4,678,280 A * | 7/1987 | Blom ............... B29D 11/00596 264/1.37 |
| 2006/0006685 A1* | 1/2006 | Shibukawa ............ B60R 13/02 296/39.1 |

(Continued)

FOREIGN PATENT DOCUMENTS

| JP | 2000-289488 A | 10/2000 |
| JP | 2015-60193 A | 3/2015 |
| JP | 2015-146003 A | 8/2015 |
| JP | 2015-210319 A | 11/2015 |
| JP | 2016-1202 A | 1/2016 |
| KR | 10-2014-0137012 A | 12/2014 |
| WO | WO 2009/157046 A1 | 12/2009 |

OTHER PUBLICATIONS

Office action dated Jul. 25, 2018 from Japan Intellectual Property Office in a counterpart Japanese Patent Application No. 2017-127061 (all the cited references are listed in this IDS.) (English translation is also submitted herewith.).

*Primary Examiner* — Jia Pan
(74) *Attorney, Agent, or Firm* — The PL Law Group, PLLC (57) ABSTRACT

A reflective light control film includes a transparent film having a plurality of protruded line patterns formed on one surface of the base film, each of the protruded line patterns including a first side having an inclination angle with respect to the one surface of the base film and a second side, and a light reflection layer provided on the first side. The reflective light control film has excellent visibility for the screen even if it is not provided with a separate shade, and the screen is prevented from being reflected on the windshield.

11 Claims, 5 Drawing Sheets

(51) Int. Cl.
  *B60J 3/00*     (2006.01)
  *G02B 27/01*    (2006.01)
  *G02F 1/137*    (2006.01)
  *G02B 5/09*     (2006.01)
  *G02B 5/00*     (2006.01)
  *G02B 5/136*    (2006.01)

(52) U.S. Cl.
  CPC ............ *G02B 27/01* (2013.01); *G02F 1/137* (2013.01); *G02F 1/1333* (2013.01); *G02F 1/133504* (2013.01); *G02F 1/133512* (2013.01); *G02F 1/133553* (2013.01); *G02B 5/003* (2013.01); *G02B 5/136* (2013.01)

(58) Field of Classification Search
  CPC .. G02F 1/133553; G02F 1/1333; B60J 3/007; B60J 3/00; B60J 3/002; G02B 27/01
  See application file for complete search history.

(56) References Cited

U.S. PATENT DOCUMENTS

| | | | |
|---|---|---|---|
| 2006/0132914 A1* | 6/2006 | Weiss | G02B 5/32 359/462 |
| 2010/0002459 A1* | 1/2010 | Lusk | B60J 3/00 362/517 |
| 2013/0010366 A1* | 1/2013 | Nakamura | G02B 27/0101 359/633 |
| 2013/0120825 A1* | 5/2013 | Lambert | G02B 27/01 359/290 |
| 2013/0120850 A1* | 5/2013 | Lambert | G02B 27/0101 359/630 |
| 2017/0159905 A1* | 6/2017 | Shido | F21S 45/50 |

\* cited by examiner

REFLECTIVE LIGHT CONTROL FILM AND DISPLAY DEVICE FOR A CAR COMPRISING THE SAME

CROSS REFERENCE TO RELATED APPLICATIONS AND CLAIM OF PRIORITY

The application claims the benefit of Korean Patent Application No. 10-2016-0083547, filed on Jul. 1, 2016, at the Korean Intellectual Property Office, the disclosures of which are incorporated by reference herein in their entirety.

BACKGROUND

1. Field of the Invention

The present invention relates to a reflective light control film and an in-vehicle display device including the same.

2. Description of the Related Art

Flat panel displays are widely used as a display device for displaying information such as cellular phones, portable information terminals (PDAs), PCs, televisions, and vehicle information display devices.

In a case of the vehicle information display device, the flat panel display is conventionally applied only to a navigation device. However, with the recent advancement of touch panel techniques, many electronic devices have been introduced into vehicles, and as electric cars have become commercialized, various input devices inside the vehicle, which have been conventionally controlled by buttons or dials, are integrated into a large-screen touch panel display device.

Figure 1:
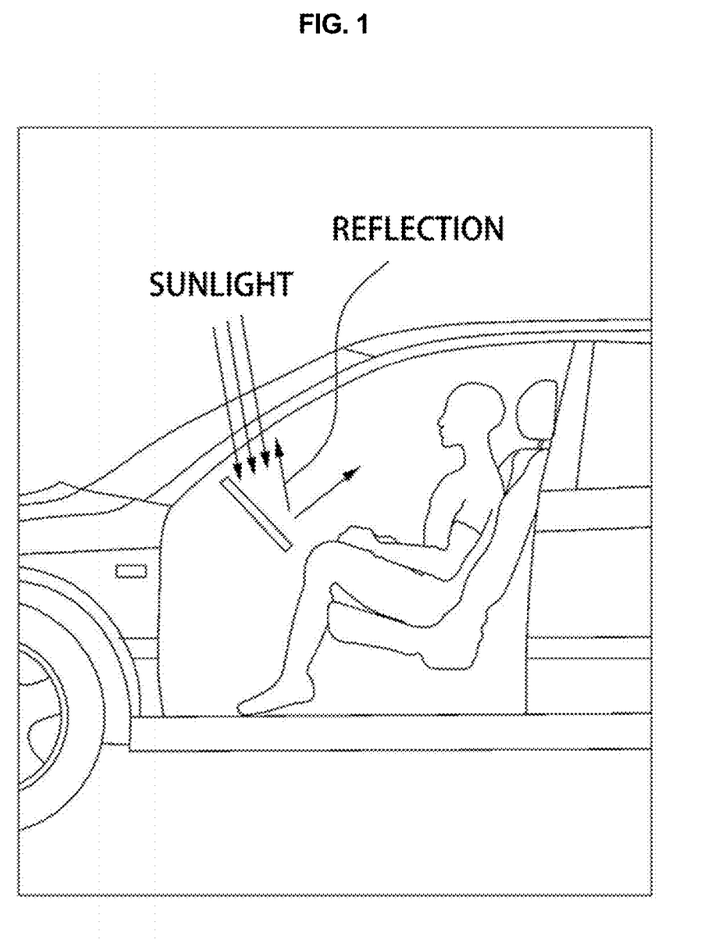
FIG. 1 is a view schematically illustrating a relationship between a conventional in-vehicle display device, sunlight and a windshield and an occupant.

However, as illustrated in FIG. 1, there are problems that it is difficult for the display screen in the vehicle to recognize the screen due to sunlight, or the screen displaying various types of information of the vehicle is reflected on a windshield to obstruct a view of the driver. In particular, such visual obstruction may cause a serious risk at night.

In order to solve the above-described problems, conventionally, a shade or the like has been provided around the display. However, when increasing a size of an in-vehicle display device, it is not easy to provide a separate shade or the like.

Meanwhile, conventionally, viewing angle limiting films have been used to limit a viewing angle of the display screen. Such a viewing angle limiting film is a film that serves to prevent an image displayed on the cellular phone or the portable information terminal from being viewed by a third party other than a user from the side or the like, thereby preventing privacy invasion and information leakage. The viewing angle limiting film is sometimes referred to as a light control film or a security film.

As disclosed in Korean Patent Laid-Open Publication No. 2014-0137012, the conventional viewing angle limiting film provides only a function that allows the screen to be viewed only when viewing in a specific direction (from the front). Therefore, the conventional viewing angle limiting film is not suitable for the in-vehicle display device in which the sunlight coming from an outside should be blocked.

SUMMARY

Accordingly, it is an aspect of the present invention to provide a reflective light control film that serves as a light control film for an in-vehicle display device, which allows an occupant to easily view the screen even if it is not provided with a separate shade, or the like.

Another aspect of the present invention is to provide a reflective light control film that serves as a light control film for an in-vehicle display device, which is capable of preventing a screen from being reflected on a windshield even if it is not provided with a separate shade, or the like.

The above aspects of the present invention will be achieved by one or more of the following characteristics.

A reflective light control film includes a transparent film having a plurality of protruded line patterns formed on one surface of the base film, each of the protruded line patterns including a first side having an inclination angle with respect to the one surface of the base film and a second side, and a light reflection layer provided on the first side. Light made incident on the other surface of the reflective light control film may be emitted to at least one of the second side and a portion in which the line pattern is not formed on the one surface.

The inclination angle may be 15° to 48°.

The second side may be formed in a direction perpendicular to the one surface.

The first side and the second side may meet each other at an end of the line pattern to form an edge.

The light reflection layer may be a metal layer.

The line pattern may have a width p of 10 to 200 μm.

The light reflection layer may have a thickness d of 100 to 800 nm.

(A ratio (L:p) of a distance L between the line patterns to the width p of the line pattern may be 1:1 to 1.4.

The reflective light control film may further include a light shielding layer disposed on the light reflection layer.

An in-vehicle display device includes the reflective light control film which is adhered to an outer surface of a display part thereof.

In a vehicle having the in-vehicle display device, the first side of the reflective light control film may face a windshield of the vehicle.

The reflective light control film of the present invention allows an occupant inside of the vehicle to easily see the screen even if it is not provided with a separate shade, or the like.

The reflective light control film of the present invention may prevent the screen from being reflected on the windshield even if it is not provided with a separate shade, or the like.

When further including the light shielding layer, the reflective light control film of the present invention may prevent the reflection of sunlight on the film, thereby further improving the visibility of the screen for the vehicle occupant.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

According to an embodiment of the present invention, a reflective light control film includes a plurality of protruded line patterns formed on one surface thereof, wherein the line pattern includes a first side and a second side which face each other in a direction different from a longitudinal direction thereof, and the first side has a predetermined inclination angle with respect to the one surface and includes a light reflection layer provided thereon, thereby the reflective light control film has excellent visibility for the screen even if it is not provided with a separate shade, and the screen is prevented from being reflected on the windshield.

In the present disclosure, the expressions "first" and "second" are used only for distinguishing components and do not have other meanings such as an order, a direction, and the like.

Hereinafter, exemplary embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

Figure 2:
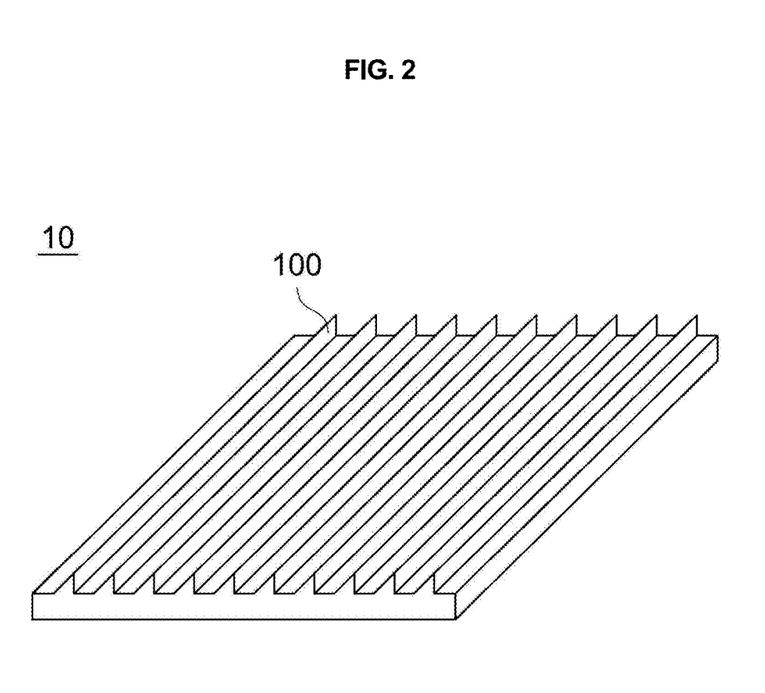
FIG. 2 is a schematic perspective view of a reflective light control film according to an embodiment of the present invention.
Figure 3:
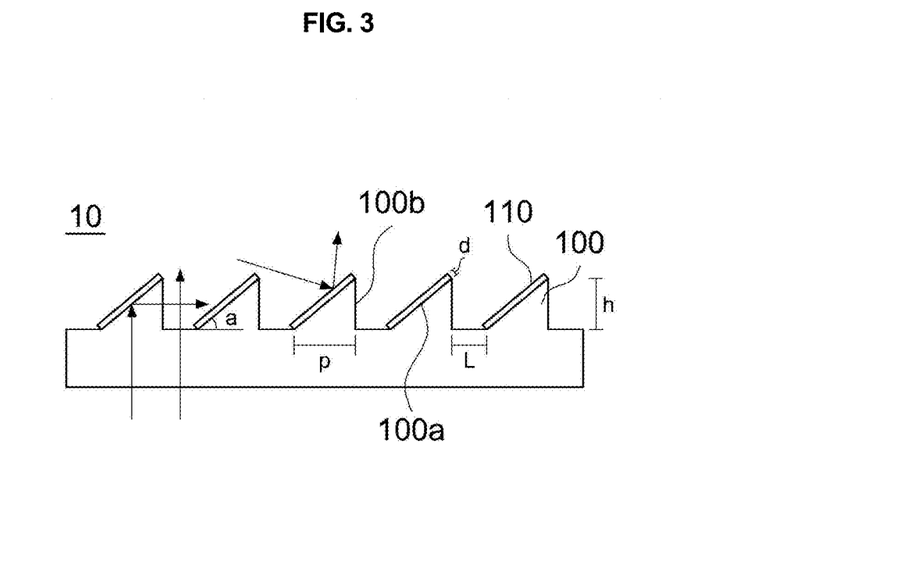
FIG. 3 is a schematic cross-sectional view of the reflective light control film according to the embodiment of the present invention.
Figure 4:
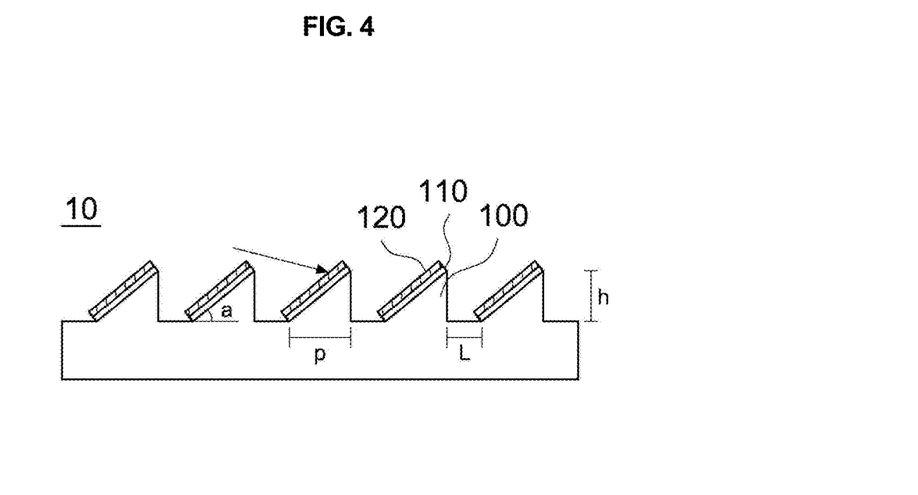
FIG. 4 is a schematic cross-sectional view of the reflective light control film according to the embodiment of the present invention.

FIGS. 2 to 4 schematically illustrate a reflective light control film according to an embodiment of the present invention.

A reflective light control film 10 of an embodiment of the present invention has a plurality of projected line patterns 100 formed on one surface thereof.

The line pattern 100 has a form of extending in a line shape from one end to the other end of the reflective light control film 10 in a longitudinal direction thereof. In the present disclosure, the longitudinal direction of the line pattern 100 means a direction of a straight line from one end to the other end of the reflective light control film 10 on which one line pattern 100 is formed.

The line pattern 100 includes a first side 100a and a second side 100b which face each other in a direction different from the longitudinal direction of the line pattern 100. In this case, in the light control film 10 according to an embodiment of the present invention, the first side 100a has a predetermined inclination angle a with respect to the one surface of the film on which the line patterns 100 are formed.

As illustrated in FIG. 1, in the conventional in-vehicle display device, if it is not provided with a shade, there are problems that it is difficult to view the screen due to the sunlight or the screen is reflected on the windshield, thereby obstructing the view of a driver.

The light control film 10 of an embodiment of the present invention includes the light reflection layer 110 provided on the inclined first side 100a of the line pattern 100, thereby it is possible to prevent the influence of the sunlight and the reflection of the screen on the windshield. That is, in the light reflection layer 110, light emitted from the display device and made incident on a surface (the other surface) opposite to the one surface of the light control film 10 on which the line patterns 100 are formed is reflected by the light reflection layer 110, then emitted to a desired direction (in a portion in which the line pattern 100 is not formed, the light may be emitted without being reflected by the light reflection layer 110), and the sunlight made incident in the direction of the display device is also reflected by the light reflection layer 110. Therefore, the desired effect of the present invention may be achieved. In this respect, the reflective light control film according to an embodiment of the present invention may be adhered to an outer surface of a display part of the in-vehicle display device, on which an image is displayed, so that the first side 100a faces a direction in which the sunlight is made incident. According to an embodiment of the present invention, the first side 100a of the reflective light control film 10 may face a windshield of the vehicle.

The first side 100a of the line pattern 100 has a structure inclined at a predetermined inclination angle a with respect to the one surface. The inclination angle a is not particularly limited so long as it may prevent the reflection of the screen on the windshield and increase the visibility of the screen, and, for example, the inclination angle may be 48° or less in an aspect of maximizing the effect. The lower limit of the inclination angle a is not particularly limited, but if it is too small, the visibility of the screen is deteriorated. Therefore, the inclination angle a of the first side is preferably 15° or more, more preferably 30° to 47°, and most preferably 44° to 46°.

The second side 100b of the line pattern 100 may be formed in a direction perpendicular to the one surface so that the light emitted from the screen may effectively reach the vehicle occupant. In the present disclosure, the expression "perpendicular" includes, of course, a case of being mathematically perpendicular to a surface, as well as a case of being substantially perpendicular thereto. The expression "substantially perpendicular" means a degree that may be commonly recognized as perpendicular to a surface, and may be, for example, a case in which the inclination angle is 80° to 100° with respect to the surface. In consideration of these aspects, the first side 100a and the second side 100b may meet each other at an end of the line pattern 100 to form an edge.

A material of the light reflection layer 110 may use any material so long as it can reflect light without particular limitation thereof, and for example, the light reflection layer may be a metal layer.

According to an embodiment of the present invention, the light reflection layer 110 may have a thickness d of 100 to 800 nm, preferably 200 to 600 nm, and more preferably 200 to 300 nm. Within this range, it is possible to maximize the effects of preventing the screen reflection onto the windshield and improving the visibility of the screen.

The line pattern 100 may have a width "p", which is defined as a size of the pattern in the direction perpendicular to the longitudinal direction of the line pattern, of 10 to 200 µm, and preferably 10 to 150 µm. Within this range, it is possible to maximize the effects of preventing the screen reflection onto the windshield and improving the visibility of the screen.

A distance L between the line patterns 100 is not particularly limited within a range capable of exhibiting the effects of the present invention, and may be, for example, from 0 to 200 µm, and preferably from 0 to 100 µm. When the distance L is 0, it means a case in which the line patterns 100 are formed in close contact with each other without a gap.

In an embodiment of the present invention, a ratio (L:p) of the distance L between the line patterns to the width p of the line pattern is 1:1 to 1.4, and preferably 1:1.2 to 1.3. Within this range, it is possible to further maximize the effects of preventing the screen reflection onto the windshield and improving the visibility of the screen.

According to another embodiment of the present invention, as illustrated in FIG. 4, the reflective light control film may further include a light shielding layer 120 disposed on the light reflection layer 110. The sunlight incident from an outside is reflected by the light reflection layer 110, and when a part of the sunlight reaches the vehicle occupant, the visibility of the screen may be decreased. However, when including the light shielding layer 120, it is possible to further improve the visibility of the screen by preventing reflection of the sunlight.

The light shielding layer 120 may use any material known in the related art without particular limitation thereof, and may use, for example, a black matrix (BM) material.

Hereinafter, a method of manufacturing the reflective light control film according to the embodiment of the present invention will be described in detail. However, since the following embodiment is an exemplary embodiment for manufacturing the reflective light control film of the present invention, the method of manufacturing the reflective light control film of the present invention is not limited thereto.

The method of manufacturing the reflective light control film according to the embodiment of the present invention may include: forming a line pattern protruded as described above on one surface of a transparent film; forming a light reflection layer on the protruded line pattern; and removing the light reflection layer on portions except for the inclined first sides of the line pattern.

More specifically, first, a line pattern protruded as described above is formed on one surface of the transparent film.

The transparent film may use any transparent film known in the related art without particular limitation thereof. For example, polyester films such as polyethylene terephthalate, polyethylene isophthalate, polybutylene terephthalate, etc.; cellulose films such as diacetylocellulose, triacetylcellulose, etc.; polycarbonate films; acryl films such as polymethyl (meth)acrylate, polyethyl (meth)acrylate, etc.; styrene films such as polystyrene, acrylonitrile-styrene copolymer, etc.; polyolefin films such as cycloolefin, cycloolefin copolymer, polynorbonene, polypropylene, polyethylene, ethylene-propylene copolymer, etc.; vinyl chloride films; polyamide films such as nylon, aromatic polyamide, etc.; imide films; sulfone films; polyetherketone films; polyphenylene sulfide films; vinyl alcohol films; vinylidene chloride films; vinyl butyral films; allylate films; polyoxymethylene films; urethane films; epoxy films; silicon films, and the like, may be used, but it is not limited thereto As a method of forming the protruded line pattern on one surface of the transparent film, there may be a method of filling a mold having a projected line pattern shape with a resin for forming a transparent film, and curing/drying the resin to prepare a protruded line pattern, or a method of pressing one surface of the prepared transparent film with a press having an engraved pattern corresponding to the line pattern to prepare a protruded line pattern.

Next, a light reflection layer is formed on the line pattern.

When a metal layer is used for the light reflection layer, a vapor deposition method may be used. By using the vapor deposition method, a smooth surface may be obtained.

Next, the light reflection layer on the portions except for the inclined first sides of the line pattern is removed.

In this case, a method capable of effectively removing a specific region of the fine pattern may be used without limitation thereof. For example, when a metal layer is deposited thereon, an ion milling method may be used. When using the ion milling, it is possible to precisely operate the process. Therefore, the remaining light reflection layers except for the inclined first side may be effectively removed.

In the present embodiment, if necessary, the inventive method may further include forming a light shielding layer on the light reflection layer of the inclined first side. The light shielding layer is formed before removing the light reflection layer on the portions except for the first side, such that a part thereof may be removed together with the light reflection layer in the removing step. Alternatively, the light shielding layer may be formed only on the light reflection layer remaining after the removing step.

Hereinafter, exemplary examples are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Examples 1 to 27

A mold capable of producing a film having a projected linear pattern was filled with a transparent acrylic resin, thus to manufacture a film having a projected linear pattern as illustrated in FIG. 1. After depositing gold (Au) on the film, portions except for the inclined surface were irradiated with ions to remove the deposited gold (Au). Specific dimensions of the patterns are shown in Table 1 below.

Experimental Example: Measurement of Transmittance

Figure 5:
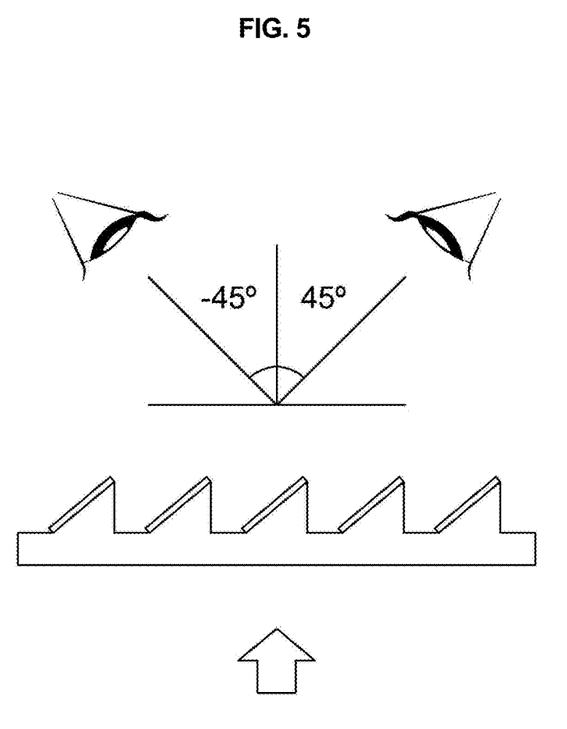
FIG. 5 is a view illustrating a conception of a viewing angle during measuring transmittance in an experimental example.

The transmittance (%) according to viewing angles was measured for the films manufactured in Examples 1 to 27, respectively, and results thereof are described in Table 1 below. The transmittance (%) according to the viewing angle was measured in such a manner that, as illustrated in FIG. 5, the other surface of the light control film was irradiated with light in a direction perpendicular to the film, then the transmittance (%) was measured when viewing the film in a direction parallel to the light irradiation direction of a light source (viewing angle is 0°), and when viewing the film at an angle of −45° to 45°, respectively. The results are described in Table 1 below.

TABLE 1

|  | Pattern size | | | | Transmittance according to viewing angle | | |
| --- | --- | --- | --- | --- | --- | --- | --- |
|  | a [°] | L[μm] | p[μm] | d[nm] | 0° | −45° | 45° |
| Example 1 | 28 | 0 | 50 | 250 | 26 | 0 | 43 |
| Example 2 |  | 10 | 50 | 250 | 32 | 0 | 47 |
| Example 3 |  | 20 | 25 | 500 | 41 | 10 | 58 |
| Example 4 |  | 30 | 25 | 500 | 51 | 19 | 59 |
| Example 5 | 38 | 0 | 50 | 500 | 56 | 0 | 55 |
| Example 6 |  | 10 | 50 | 500 | 59 | 0 | 56 |
| Example 7 |  | 20 | 25 | 250 | 59 | 1 | 57 |
| Example 8 |  | 30 | 25 | 250 | 63 | 12 | 58 |

TABLE 1-continued

|  | Pattern size | | | | Transmittance according to viewing angle | | |
| --- | --- | --- | --- | --- | --- | --- | --- |
|  | a [°] | L[μm] | p[μm] | d[nm] | 0° | −45° | 45° |
| Example 9 | 44 | 20 | 25 | 250 | 79 | 0 | 63 |
| Example 10 | 45 | 0 | 25 | 250 | 72 | 1 | 60 |
| Example 11 |  | 10 | 25 | 250 | 78 | 1 | 62 |
| Example 12 |  | 20 | 25 | 250 | 81 | 1 | 64 |
| Example 13 |  | 30 | 25 | 250 | 82 | 6 | 64 |
| Example 14 |  | 40 | 25 | 250 | 84 | 15 | 63 |
| Example 15 |  | 20 | 50 | 500 | 67 | 1 | 58 |
| Example 16 |  | 30 | 50 | 500 | 70 | 1 | 58 |
| Example 17 | 46 | 20 | 25 | 250 | 82 | 2 | 63 |
| Example 18 | 47 | 20 | 25 | 250 | 80 | 4 | 64 |
| Example 19 | 48 | 0 | 25 | 500 | 56 | 4 | 52 |
| Example 20 |  | 10 | 25 | 500 | 65 | 4 | 55 |
| Example 21 |  | 20 | 50 | 250 | 76 | 6 | 62 |
| Example 22 |  | 30 | 50 | 250 | 78 | 6 | 62 |
| Example 23 | 45 | 10 | 12.5 | 250 | 81 | 1 | 63 |
| Example 24 |  | 40 | 50 |  | 81 | 1 | 64 |
| Example 25 |  | 60 | 75 |  | 81 | 1 | 63 |
| Example 26 |  | 80 | 100 |  | 81 | 1 | 64 |
| Example 27 |  | 100 | 125 |  | 81 | 1 | 63 |

Referring to Table 1, in the case of the reflective light control films of the present invention, since the first side including the light reflection layer have a remarkably low transmittance (transmittance of −45°), reflection of the screen image onto the windshield hardly occurs, thus it can be understood that the degree of a decrease in the visibility due to the sunlight is low.

Meanwhile, since the transmittance at 0° is high in the direction in which the occupant inside the vehicle views, thus it can be understood that the visibility of the screen is excellent.

Figure 6:
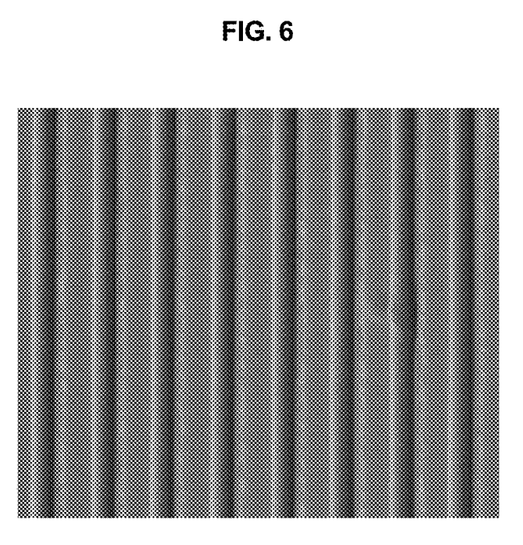
FIGS. 6 and 7 are scanning electron microscope (SEM) photographs of the reflective light control film according to the embodiment of the present invention.
Figure 7:
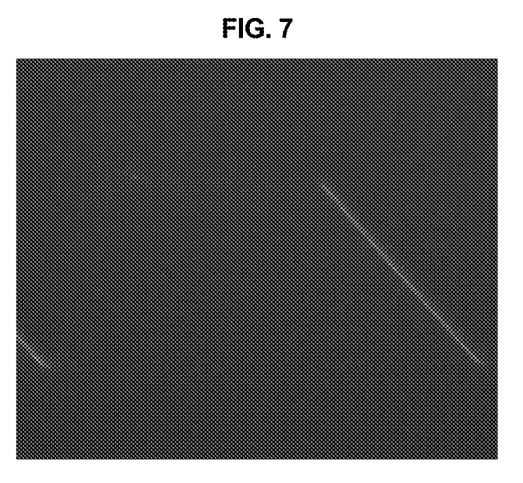

For reference, an image of the film manufactured in Example 12 was taken by means of a scanning electron microscope (SEM), and a top photograph (FIG. 6) and a cross-sectional photograph (FIG. 7) are illustrated in FIGS. 6 and 7, respectively. In FIG. 7, an oblique bright portion is the light reflection layer of the first side, on which the gold (Au) is deposited. Since an overcoat layer was coated on the light control film for taking the image and an image of the cross-section was taken, a boundary between the light control film and the overcoat layer, which are the same organic material, did not appear and only the light reflection layer was distinguished.

What is claimed is:

1. A reflective light control film comprising:
a transparent film having one surface and the other surface opposite to the one surface, a plurality of protruded line patterns formed on the one surface, each of the plurality of protruded line patterns including a first side having an inclination angle with respect to the one surface and a second side;
a light reflection layer provided on the first side, the light reflection layer having a first surface being in contact with the first side and a second surface opposite to the first surface; and
a light shielding layer disposed directly on the second surface of the light reflection layer,
wherein the second side is transparent, and
light incident on the other surface is reflected by the first surface of the light reflection layer, and then shielded by an adjacent light shielding layer.

2. The reflective light control film of claim 1, wherein the one surface of the transparent film has gaps between the plurality of protruded line patterns; and
light incident on the other surface is emitted to at least one of the second side and the gaps.

3. The reflective light control film of claim 1, wherein the inclination angle is 15° to 48°.

4. The reflective light control film of claim 1, wherein the second side is formed in a direction perpendicular to the one surface.

5. The reflective light control film of claim 1, wherein the first side and the second side meet each other at an end of the line pattern to form an edge.

6. The reflective light control film of claim 1, wherein the light reflection layer is a metal layer.

7. The reflective light control film of claim 1, wherein the line pattern has a width of 10 to 200 μm.

8. The reflective light control film of claim 1, wherein the light reflection layer has a thickness of 100 to 800 nm.

9. The reflective light control film of claim 1, wherein a ratio of a distance between the line patterns to the width of the line pattern is 1:1 to 1:1.4.

10. An in-vehicle display device comprising a display part and the reflective light control film of claim 1, wherein the other surface is adhered to an outer surface of the display part.

11. A vehicle having the in-vehicle display device of claim 10, wherein the first side faces a windshield of the vehicle.

* * * * *